United States Patent [19]

Kumpf

[11] 4,035,974
[45] July 19, 1977

[54] PRESSURE TANK FOR NUCLEAR REACTORS WITH CONCRETE ENCLOSURE

[75] Inventor: Hermann Kumpf, Wendelstein, Germany

[73] Assignee: Kraftwerk Union Aktiengesellschaft, Mulheim (Ruhr), Germany

[21] Appl. No.: 516,601

[22] Filed: Oct. 21, 1974

Related U.S. Application Data

[63] Continuation of Ser. No. 352,265, April 18, 1973.

[30] Foreign Application Priority Data

Apr. 20, 1972 Germany .............................. 2219412

[51] Int. Cl.² .................. G21C 13/04; E04B 1/98
[52] U.S. Cl. .................................... 52/249; 52/573; 176/87
[58] Field of Search ................ 52/249, 410, 245, 573; 176/87

[56] References Cited

U.S. PATENT DOCUMENTS

| 3,151,416 | 10/1964 | Eakin et al. | 52/249 |
| 3,454,080 | 7/1969 | Kunzli | 52/249 |
| 3,640,032 | 2/1972 | Jubb | 176/87 |
| 3,720,581 | 3/1973 | Kaser | 176/87 |

FOREIGN PATENT DOCUMENTS

| 1,383,795 | 11/1964 | France | 52/249 |
| 932,581 | 7/1963 | United Kingdom | 220/9 LG |

Primary Examiner—James L. Ridgill, Jr.
Attorney, Agent, or Firm—Herbert L. Lerner

[57] ABSTRACT

A pressure tank construction for nuclear reactors includes a steel tank which is inserted into a concrete enclosure. A clearance is provided between the steel tank and concrete enclosure when the steel tank is unpressurized and at ambient temperature. Under operating conditions, the steel tank expands and bears against the concrete enclosure. A support and insulatory means is also provided between the steel tank and the concrete enclosure.

8 Claims, 4 Drawing Figures

PRESSURE TANK FOR NUCLEAR REACTORS WITH CONCRETE ENCLOSURE

This is a continuation of application Ser. No. 352,265 filed Apr. 18, 1973.

In order to generate sufficiently large output, pressurized or boiling-water reactors must be equipped with large, pressure and temperature-resistent pressure tanks. Beyond a certain output, steel tanks for this purpose must be constructed with very large wall thicknesses. Also such steel tanks, because of their size, are difficult to transport. For this reason it has heretofore been proposed to fabricate pressure tanks for nuclear reactor of concrete.

With such a construction, the insulation may be arranged between the inside wall of the concrete and the interior of the tank. There are basically two different possibilities or methods for sealing the tank. According to the first method, the layer of thermal insulation is disposed against the sealing skin or sealing layer on the outside of the latter. This offers the advantage that the primary medium located in the interior of the tank does not penetrate the layer of thermal insulation so that in such a case there exists a certain freedom in the choice of the insulating medium. In return for this advantage, however, problems regarding the "hot" sealing layer arise. For example if the sealing layer consists of multi-layer sheet metal, the latter is subjected, because of the high temperatures, to tension stresses which far exceed the elastic limit of the material. This may lead to cracks and therefore to leaks.

These problems are avoided in the second possible type of design employing a "cold" sealing skin or sealing layer. In this case the sealing layer is arranged outside of the layer of thermal insulation so that the sealing layer is no longer subjected to large temperature variations. However, in this case, the layer of insulation is now disposed in the interior of the tank and therefore must be immune against the affects of the primary cooling medium of the reactor and the radioactive radiation. An ideal insulating material for this purpose has so far not been found. An insulation consisting of several sheets of metal which are held at a distance from each other and whose heat-retarding effect consists essentially of series-connected heat transfer paths between the liquid and the sheet metal, still has a relatively high degree of heat transmissivity and also cannot be produced without special effort because many small spacings between the sheets must be maintained.

Accordingly, it is an object of the present invention to create a pressure tank for nuclear reactors in which the layer of thermal insulation lies, as in the type described first hereinabove, outside the sealing skin or sealing layer for sealing the pressure tank and in which the stress of the sealing skin or sealing layer can nevertheless be maintained below the elastic limit.

Thus, the present invention thus relates to a cylindrical pressure tank for nuclear reactors with a prestressed concrete enclosure which can be fabricated at the installation site and which takes up the internal pressure of the cylindrical pressure tank. Thermal insulation means is arranged between the concrete enclosure and a layer for sealing the pressure tank. According to the present invention, a steel tank is provided as the layer for sealing the pressure tank and this steel tank is designed to handle only part of the internal pressure. The dimensions of the steel tank are chosen so that under operating conditions, the steel tank is braced or bears against the concrete enclosure via a support and insulating layer, while provision is made for radial expansion and axial expansion of the steel tank in the space between the steel tank and the concrete enclosure which exists when the pressure tank is unpressurized and at ambient temperature.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention however, together with additional objects and advantages thereof will be best understood from the following description of specific embodiments when read in connection with the accompanying drawings, in which.

Figure 1:
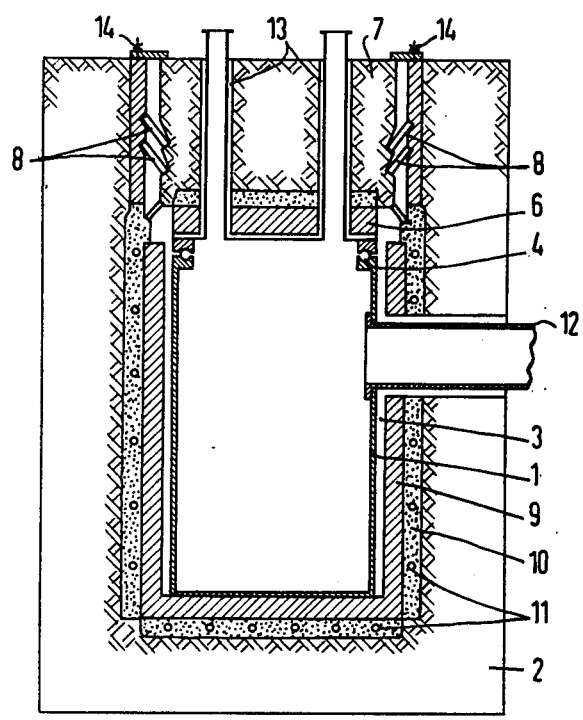
FIG. 1 is a cross sectional view of a cylindrical pressure tank for a nuclear reactor according to one embodiment of the invention.

Referring to the drawings, FIG. 1 shows a steel tank 1 arranged inside a concrete enclosure 2. The wall thickness of the steel tank 1 is selected so that it can withstand part of the operating pressure which adjusts itself later. The steel tank 1 is held in the prestressed concrete tank 2 which is closed by a concrete lid 7. The concrete tank 2 provides a clearance 3 in the radial direction and play for expansion 4 in the axial direction. The concrete lid 7 is provided with breakthroughs or openings 13, for example, for control rod drives or core instrumentation. Also provided are carrying bolts 14 for tensioning a multiple knuckle lock 8 which serves to transmit the pressure forces from the concrete lid 7 to the concrete enclosure 2. A lid 6 for the steel tank 1 is connected with the concrete lid 7 and can be lifted together with the latter. If not too many lid breakthroughs or openings are provided, the steel lid 6 and the concrete lid 7 may also be separated from each other during installation.

The steel tank 1 is surrounded by a thermal insulation layer 9 and a layer of lean concrete 10, in which cooling pipes 11 are embedded, is disposed between the insulation layer 9 and the concrete enclosure 2. A lateral pipe connection 12 is also provided as shown in the cross section in FIG. 1.

When the pressure tank 1 is first put into operation, a pressure in the order of one-third of the nominal pressure is initially adjusted in the tank. If subsequently, the interior of the pressure tank is heated, the wall of the steel tank 1 comes to rest or bear against the support and insulating layer 9 and braces itself via the latter and the layer of lean concrete 19 against the concrete enclosure 2. At this point the wall of the steel tank 1 is also stressed in tension. When the pressure and the temperature in the interior of the pressure tank are increased further, the steel tank 1 attempts to bulge further but cannot expand any further. As a result, the tension stress in the wall of the steel tank 1 becomes continuously smaller and becomes a compression stress if the spaces 3 and 4 are chosen appropriately. Through the choice of the spaces 3 and 4 it is therefore possible to choose the stress of the steel tank 1 according to the operating conditions of the pressure tank 1.

As the temperature in the steel tank 1 rises, the latter, however, will not only come in contact with the thermal insulation layer 9, but will shift along the thermal insulation layer 9 to an increasing extent from the bottom to the top. It is therefore necessary to ensure, in addition to accurate maintenance of the space 3 in the radial direction and the space 4 in the axial direction, that the friction forces between the thermal insulation layer 9 and the steel tank 1 are as small as possible.

Figure 2:
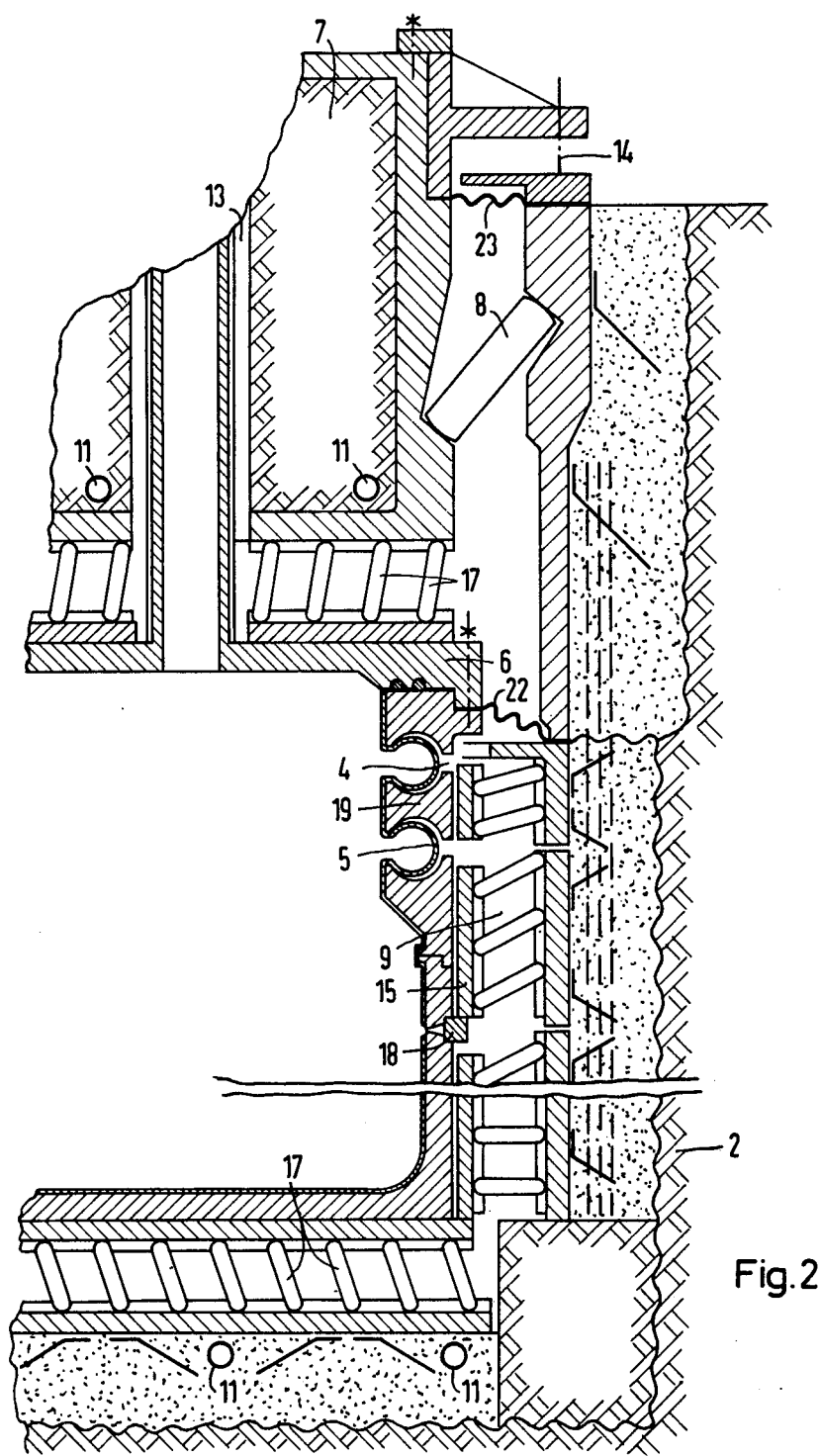
FIG. 2 is a partial sectional view, on a larger scale, of the pressure tank shown in FIG. 1.
Figure 3:
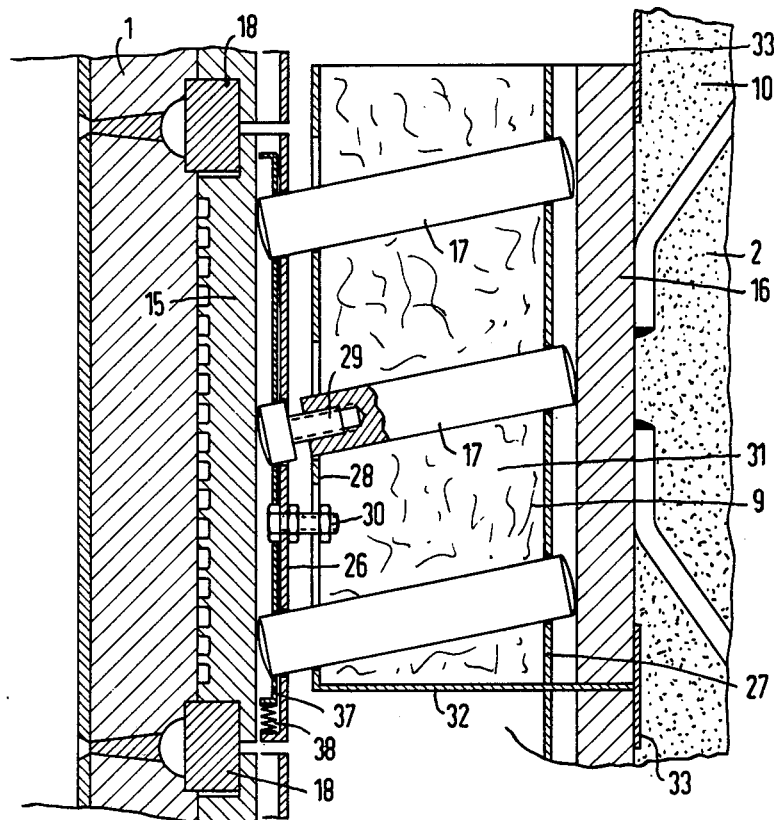
FIG. 3 is a partial sectional view, on yet a larger scale, of the presure tank shown in FIGS. 1 and 2.
Figure 4:
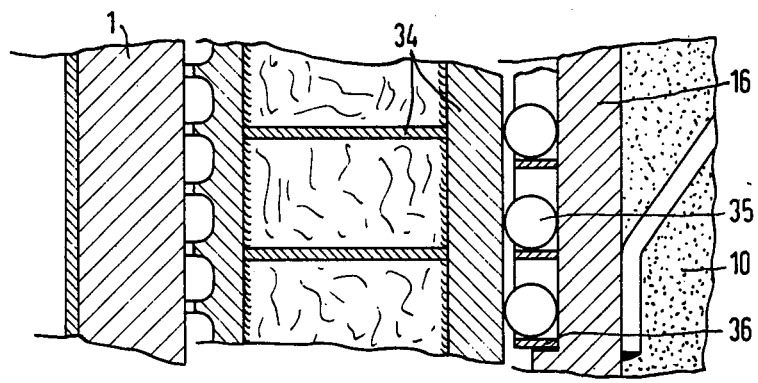
FIG. 4 is a partial sectional view, similar to FIG. 3 but showing an alternate embodiment.

Particularly advantageous embodiments and design details of the pressure tank are shown in FIGS. 2 to 4 as examples for fulfilling these requirements. In these Figures, similar parts are labelled with the same reference numerals as in FIG. 1. As shown in FIG. 2 the support and insulating layer 9 consists of articulated legs 17 which are held between an outer support plate 16 and an inner support plate 15, respectively. The articulated legs 17 are described hereinafter in greater detail in connection with FIG. 3. A sealing diaphragm is provided as second safety means against the escape of radioactive material. For the adjustment of the space 4 in the axial direction, support rings 19 are provided at the upper portion of the steel tank 1, which in the cold and pressure-free condition of the pressure tank as shown in FIG. 2 are held at a distance or are spaced from each other. The support rings 19 are bridged by toroidal expansion elements 5 which are held in toroidal openings in the support rings 19. Catch rings 18 are provided on which the inner support plates 15 rest so that the support plates 15 cannot shift relative to the steel tank 1. The outer support plates 16 are firmly connected with the lean concrete 10.

The design and support of the articulated legs 17 are shown in detail in FIG. 3. In the operating condition, the inner support plate 15 rests or bears against the steel tank 1. At the juncture or contact between the steel tank 1 and the inner support plate 15, the latter is provided with machined grooves so that cavities resulting from the grooves contribute to the thermal insulation. An inner perforated sheet 26 is firmly connected with the inner support plate 15. Prior to the installation of the steel tank 1 the support and insulating layer 9 is attached at the circumference of the steel tank 1 and together with the latter is inserted into the concrete enclosure 2. Furthermore, the inner perforated sheet 26 is bolted, by means of a fitting bolt 30, with an outer support sheet 28 which is connected with the outer support plate 16 by means of a sheet metal holder 32. The articulated legs 17 are held in openings in the outer support sheet 28 in the outer perforated sheet 27 and project through openings in the inner perforated sheet 26. The articulated legs 17 are somewhat shorter than the distance between the inner and the outer support plate.

Some of the articulated legs 17 are made in two parts which are screwed together via a threaded connection 29. The two parts of such an articulated leg are together of the same length as the other articulated legs. However, in the condition prior to the installation of the steel tank 1 into the concrete enclosure 2, as shown in FIG. 3, the articulated legs having two parts are longer as the two parts have, due to the thread 29, an adjustable distance of such length as is required to obtain a space of the desired size between the steel envelope and the concrete enclosure 2.

With the construction and arrangement of the pressure tank as heretofore described, it is possible to insert the steel tank 1 with the inner and outer support plates bolted thereto into the concrete enclosure 2. Subsequently, the gaps between the adjoining outer support plates 16 are sealed by providing cover sheets 33, and the still existing space between the concrete enclosure 2 and the outer support plate 16 is filled with lean concrete 10. Cooling pipes may be installed, if desired, before the aforementioned lean concrete 10 is poured. This procedure makes it possible to tolerate the inaccuracies which occur in the fabrication of large steel and concrete structures without affecting the accuracy of the adjustment of the space between the steel tank and the concrete enclosure.

Between the inner support plate 15 and the inner perforated sheet 26 there is further provided a sliding sheet 37 supported by means of springs 38. The springs 38 serve to provide that the articulated legs 17 always rest against the upper edge of the openings in the inner perforated sheet 26 if the articulated legs 17 are not under load. The openings in the inner perforated sheet 26 are thereby prevented from enlarging.

The insulating effect of the thermal insulating layer 9 is assured when such articulated leg structures are used due to the fact that air is present between the articulated legs 17. If it is desired to avoid or reduce the heat transfer due to air circulation, insulation 31, for example aluminum foil, may be placed in this air space. As this space is sealed against the primary medium of the reactor, other insulating materials which are sensitive to the medium in the interior of the pressure tank may also be used for this purpose.

I claim:

1. Cylindrical pressure tank structure for nuclear reactors comprising a prestressed concrete enclosure, a steel pressure tank for pressurized medium mounted in said concrete enclosure and supporting and insulating means disposed between the outside of said steel tank and the inside of said concrete enclosure, said steel tank in unpressurized condition and at ambient temperature having a radial and axial spacing from said concrete enclosure, said steel tank being expansible at operating condition during which it is pressurized so as to take up at least part of said radial and axial spacing and bear through said supporting and insulating means against said concrete enclosure, said supporting and insulating means comprising an inner support plate adjacent said outside of said steel tank and an outer support plate spaced from said inner support plate and disposed adjacent the inside of said pressurized concrete enclosure and a plurality of spaced articulated legs disposed between said inner and said outer support plates, said steel tank together with said supporting and insulating means being mounted in said concrete enclosure so that said steel tank is at a given maximal spacing from said concrete enclosure maintained by said spaced articulated legs, said steel tank, said inner support plate and said spaced articulated legs being shiftable together, as said pressurized operating condition during which said steel tank expands, to a predetermined limit at which said expanding steel tank together with said inner support plate and said spaced articulated legs rigidly abuts said outer support plate and said concrete enclosure and is blocked thereby from further expansion.

2. Cylindrical pressure tank structure for nuclear reactors comprising a prestressed concrete enclosure, a steel tank for pressurized medium mounted in said prestressed concrete enclosure, and supporting and insulating means disposed between the outside of said steel tank and the inside of said concrete enclosure, said steel tank in unpressurized condition and at ambient temperature having a radial and axial spacing from said concrete enclosure, said steel tank being expansible at operating condition during which it is pressurized so as to take up at least part of said radial and axial spacing and bear through said supporting and insulating means against said concrete enclosure, said supporting and insulating means comprising an inner support plate adjacent said steel tank and an outer support plate, spaced from said inner support plate and disposed adjacent the inside of said prestressed concrete enclosure, and a plurality of spaced articulated legs disposed between said inner and outer support plates, said steel tank together with said supporting and insulating means being mounted in said concrete enclosure so that said steel tank is at a given maximal spacing from said concrete structure maintained by said spaced articulated legs, said spaced articulated legs being restoringly yieldable to a predetermined limiting value to which said steel tank is expansible as said pressurized operating condition until said steel tank together with said inner support plate and said spaced articulated legs abuts said outer support plate and said concrete enclosure and is blocked thereby from further expansion.

3. Cylindrical pressure tank structure according to claim 2 including a sheet member formed with openings through which said articulated legs, respectively, extend, and biasing means urging said sheet in a direction to dispose said articulated legs in a predetermined position at said unpressurized condition of said steel tank and at ambient temperature.

4. Cylindrical pressure tank structure according to claim 2 wherein said supporting and insulating means and said steel tank are mutually separated radially and axially by empty space.

5. Cylindrical pressure tank structure according to claim 2 wherein at least one of said articulated legs comprises a first part, and a second part threadedly secured to said first part, said first and second parts having portions thereof, respectively, spaced from one another in said unpressurized condition of said steel tank and at ambient temperature, said threadedly secured first and second parts having a length substantially equal to the thickness of said supporting and insulating means and said radial spacing in said unpressurized condition of said steel tank and at ambient temperature, radial and axial expansion of said steel tank during pressurized operating condition thereof being taken up by the threaded connection of said first and second parts.

6. Cylindrical pressure tank structure according to claim 2 wherein said supporting and insulating means includes a pair of spaced sheet members, each formed with openings therein, said articulated legs being disposed, respectively, in said openings.

7. Cylindrical pressure tank structure according to claim 2 including a steel lid provided on said steel tank, and a plurality of metallic expansion members disposed in an axial space located between said steel tank and said steel lid.

8. Cylindrical pressure tank structure according to claim 3 wherein said expansion members include multilayer toroidal members, and respective support rings located between said toroidal members, said toroidal members bearing against said support rings along substantially the entire periphery thereof at said pressurized operating condition of said steel tank.

* * * * *